(12) United States Patent
Sauerland et al.

(10) Patent No.: US 11,346,655 B2
(45) Date of Patent: May 31, 2022

(54) APPARATUS FOR MEASURING A THREAD

(71) Applicant: SMS Group GmbH, Duesseldorf (DE)

(72) Inventors: Martin Sauerland, Niederkrüchten (DE); Frank d'Hone, Cologne (DE)

(73) Assignee: SMS GROUP GMBH, Duesseldorf (DE)

( * ) Notice: Subject to any disclaimer, the term of this patent is extended or adjusted under 35 U.S.C. 154(b) by 124 days.

(21) Appl. No.: 16/306,658

(22) PCT Filed: Jun. 2, 2017

(86) PCT No.: PCT/EP2017/063481
§ 371 (c)(1),
(2) Date: Dec. 3, 2018

(87) PCT Pub. No.: WO2017/207765
PCT Pub. Date: Dec. 7, 2017

(65) Prior Publication Data
US 2019/0137264 A1 May 9, 2019

(30) Foreign Application Priority Data
Jun. 3, 2016 (DE) .......................... 102016209762.8

(51) Int. Cl.
*G01B 11/24* (2006.01)
*G01B 11/245* (2006.01)
*B25J 19/02* (2006.01)

(52) U.S. Cl.
CPC ......... *G01B 11/2425* (2013.01); *B25J 19/021* (2013.01); *B25J 19/022* (2013.01); *G01B 11/245* (2013.01)

(58) Field of Classification Search
CPC . G01B 11/24; G01B 11/2416; G01B 11/2425; G01N 2021/4711
See application file for complete search history.

(56) References Cited

U.S. PATENT DOCUMENTS

| | | | |
|---|---|---|---|
| 5,291,272 A | 3/1994 | Demirsu | |
| 8,682,465 B2* | 3/2014 | Bonadeo | G01B 11/2425 700/109 |
| 8,804,104 B2 | 8/2014 | Honda | |
| 9,581,423 B2* | 2/2017 | Alxneit | G01B 5/004 |

FOREIGN PATENT DOCUMENTS

| | | |
|---|---|---|
| JP | 63191007 | 8/1988 |
| JP | 2010038554 | 2/2004 |

* cited by examiner

*Primary Examiner* — Rebecca C Bryant
(74) *Attorney, Agent, or Firm* — Abelman, Frayne & Schwab

(57) ABSTRACT

An apparatus for measuring a thread includes a holder for detachably holding a tube having a thread formed at an end of the tube. A first optical measuring section having an optical sensor is attached to a manipulator in order to move the measuring section relative to the tube. The optical measuring section is adjustably tiltable about a first adjusting axis relative to a thread axis of the thread. A second optical measuring section having a second optical sensor is arranged at the manipulator, wherein the optical measuring sections collectively form a measuring channel to provide simultaneous measurement of opposite sides of the thread of the tube.

9 Claims, 4 Drawing Sheets

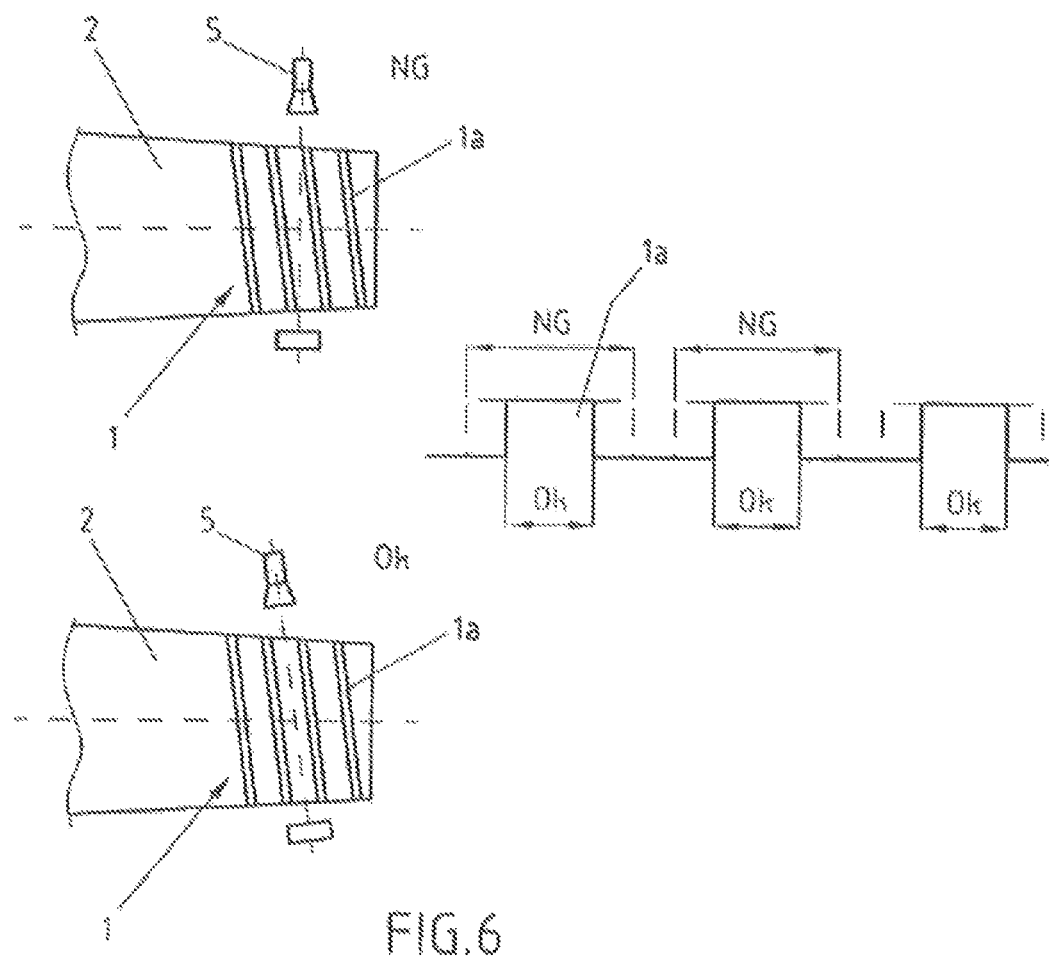
FIG.6
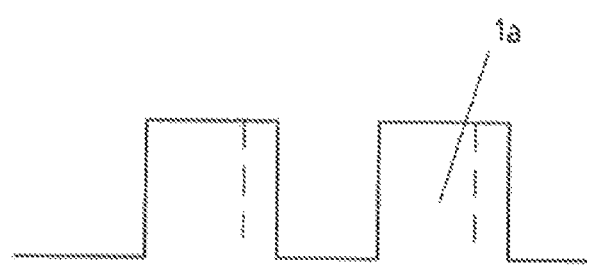
FIG.7
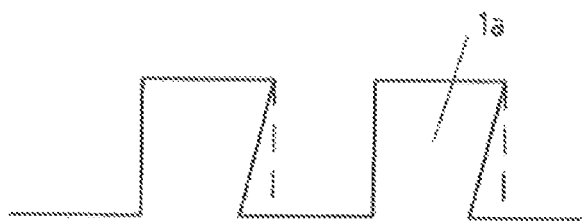

APPARATUS FOR MEASURING A THREAD

RELATED APPLICATIONS

This application is a National Stage application of International application PCT/EP2017/063481 filed on Jun. 2, 2017 and claiming priority of German Application DE 10 2016 209762.8 filed Jun. 3, 2016, both applications are incorporated herein by reference thereto.

FIELD OF INVENTION

The invention relates to an apparatus for measuring a thread.

BACKGROUND OF RELATED ART

EP 2 259 025 A1 describes an apparatus for measuring a thread on a tube end, wherein a first optical measuring apparatus as well as a second, mechanical, sensory measuring apparatus is arranged so that it can be moved on a table. The optical measuring apparatus comprises only a single measuring section. The measuring section can move linearly in three sequentially vertical spatial directions and in addition can be pivoted about a single tilting axis which runs approximately vertically to a tube axis.

The invention has the problem of indicating an apparatus for measuring a thread which makes an especially precise quality control possible.

SUMMARY

This problem is solved for an initially cited apparatus according to the invention by the characterizing features of Claim 1. A simultaneous measuring of the thread on opposite sides of the tube can take place by the combination of at least two optical measuring sections to one measuring conduit. As a result thereof, in addition to the formation of the thread courses, positioning errors, deformations and other errors can be determined at the same time over the entire diameter.

In particular the at least two measuring sections of a measuring conduit can be precisely positioned relative to one another here so that measured deviations regarding opposite tube areas can be traced back to the thread itself.

The term measuring section denotes in the sense of the invention any optical detection system with an optical sensor with which an object can be optically measured in an area. The at least two measuring sections therefore detect two spatially different areas of the object. As a result of a known alignment of the measuring sections to one another, a measuring conduit is given on the whole with which measuring information can also be achieved about the relative position of the two measured areas.

A tube with a thread preferably denotes in the sense of the invention tubes with outer threads and a diameter between 20 mm to 600 mm. Such tubes are used, for example, in the exploration of oil and gas. They are usually high-grade, seamlessly rolled tubes which are refined after the rolling on at least one end with a thread which is cut on. High requirements are placed on the position of the threads of such tubes. A customary standard for the definition of the requirements for the accuracy to size of the threads is the standard API 5B of the American Petroleum Institute.

An adjusting axis in the sense of the invention is a geometrical axis. The adjusting axis can but does not have to coincide with a solid axis. The tilting about the adjusting axis can also take place in particular superposed by a translatory movement.

A manipulator can, in the sense of the invention, move the measuring section and/or the measuring conduit in a translatory manner in one or more spatial directions and in addition can perform the tilting about the adjusting axis. The movements of the manipulator are preferably completely driven by motors and can be controlled by an electronic control unit.

A thread axis in the sense of the invention is defined by the geometric structure of the thread cut on the tube end as its central axis. The thread axis can deviate from a central axis of the tube in particular due to permitted or also non-permitted tolerances.

An especially preferred embodiment of the invention provides that the measuring conduit can be tilted by the manipulator about at least one second adjusting axis relative to the thread axis so that the measuring conduit can be freely aligned inside an interval of a spatial angle. Differently than in previously known systems in which an alignment takes place at the most about one angle in a single plane, an oblique state of the thread axis, which can be any one regarding the spatial direction, can therefore be brought into an exact alignment with the measuring conduit. The oblique state of the thread axis can also be traced back to different causes, for example, a sagging of the tube, a deviation of thread axis and of tube axis, a tolerance in the tube holder or the like. A rise of the thread can preferably be included as a previously known magnitude in the alignment over the adjusting axes.

In a preferred further development an alignment of the measuring conduit for the measuring of the thread takes place in that as a result of the tiltings about the adjusting axes an extremum of an optical width of a thread course is adjusted. Depending on the thread shape and the requirements, the maximizing of the projected width of a thread bottom of the thread course and/or the minimizing of the projected width of a thread tip of the thread course can be concerned. In any case, the measuring of an extremum makes possible a rapid alignment with simultaneously a high accuracy.

In a generally advantageous manner, the measuring conduit can be arranged on a carrier which can be moved about the adjusting axes, wherein the carrier can move via a linear guide along a main direction. This ensures in a simple mechanical manner that the alignment is exactly retained once it has been set when the carrier is subsequently moved along the main direction in order to measure the thread. A thread rise can be previously selected as a previously known magnitude advantageously by an appropriate adjusting possibility between the carrier and the measuring conduit.

In order to achieve a rapid and efficient measuring of the thread, it is provided that the measuring conduit is moved in a first step by the manipulator into coincidence with (i.e., overlie) the thread, wherein an alignment of the measuring conduit with the thread axis takes place, and that the measuring conduit is moved out of the coincidence (i.e., away from) the thread in a second step in the opposite direction, wherein a measuring of the thread takes place.

A possible embodiment provides in order to achieve a universal and economical realization that the manipulator comprises a freely movable industrial robot. The term industrial robot is in the present sense every commercially available, programmable manipulator designed for universal tasks.

In an advantageous embodiment at least one second measuring conduit is arranged on the manipulator, wherein the measuring conduits are aligned on different areas of the thread in its circumferential direction. This simultaneously allows the measuring of the thread at several positions distributed over the circumference, which significantly accelerates the measuring. In particular, it can be achieved, given a sufficient number of measuring conduits, that neither the tube nor the measuring apparatus must be rotated about the thread axis. After such a rotation, at least one new alignment of the measuring conduit would be necessary on account of occurring tolerances.

The number of measuring conduits can be advantageously adapted to expected deviations in the manufacture. Therefore, for example, the rolling of the tube with a 2-roller method possibly results in an undesirably large 2-point ovality which can be readily detected with two measuring conduits rotated by 90 degrees. The rolling of the tube with a 3-roller method possibly leads to an undesirably large 3-point ovality which can be readily detected with three measuring conduits each rotated 60 degrees relative to each other.

In an advantageous further development of the invention, at least one light-section sensor is additionally arranged on the manipulator, wherein the surface of a preferably undercut thread flank can be measured by the light-section sensor. This readily allows the detection of surface errors such as can arise, for example, by a tool break during the cutting of a thread. Such errors for the optical measuring sections are invisible at least in undercut in areas so that an improved measuring is achieved with simple means. The light-section sensor is preferably arranged here in the same receptacle with the measuring conduit on the manipulator so that an alignment of the measuring conduit also means an alignment of the light-section sensor.

In addition, in an especially preferred further development at least one second light-section sensor is arranged on the manipulator, wherein an opposing flank of the thread course can be measured by the second light-section sensor.

It is preferable that at least one of the optical measuring sections comprises an optical measuring instrument selected from the group of telecentric lenses, laser scanners and laser triangulators or LCD light band scanners (μ-meter). A laser scanner in the present sense is also designated as a laser micrometer or laser scan micrometer. A telecentric lens in the sense of the invention is an illustrating lens which comprises a substantially parallel beam path in the area of the object to be illustrated so that a low-distortion illustration and measuring of the object is made possible.

It is generally advantageous in a device according to the invention that the tube does not move during the entire measuring. In this manner, no other deviations in the positioning of the thread relative to the measuring conduit are introduced. A movement in the course of the measuring then takes place exclusively by the movable measuring conduit.

It is preferably provided for a rapid and problem-free course and a low maintenance expense of the apparatus that the measuring of the thread takes place completely without a mechanical contact of a measuring sensor.

Other advantages and features result from the exemplary embodiments described in the following and from the dependent claims.

BRIEF DESCRIPTION OF THE DRAWINGS

Preferred exemplary embodiments of the invention are described in the following and are explained in detail using the attached drawings.

FIG. 6 shows a sketch for explaining an alignment procedure by the apparatus of FIG. 1.

FIG. 7 shows a view of an undercut thread.

DETAILED DESCRIPTION

Figure 1:
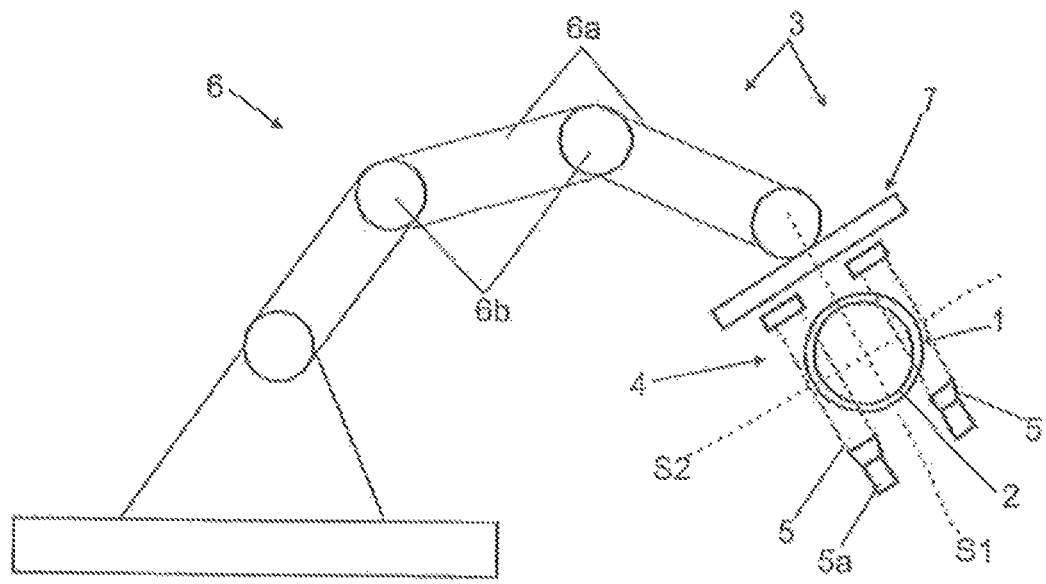
FIG. 1 shows a schematic total view of a first exemplary embodiment of an apparatus according to the invention.

The apparatus shown in FIG. 1 serves to measure a thread 1 which was cut in a previous manufacturing step on the end of a tube 2. The measuring serves for quality control. Depending on the requirements, the measuring can be made by taking samples. Each thread produced is preferably checked by the apparatus.

The tube 2 is firmly held during the measuring by an especially rigid holder (not shown). The tube does not experience any movement or rotation during the measuring.

The apparatus according to the invention comprises a manipulator 3 with which a measuring conduit 4 with two optical measuring sections 5 can be moved in space. The manipulator 3 comprises in the present instance, for example, a universal industrial robot 6. An arm of the robot comprises several segments 6a which can pivot relative to each other via articulations 6b. A carrier 7 as another part of the manipulator is attached to the end of the arm in which carries the measuring conduit 4.

The measuring conduit 4 can be moved back-and-forth with a high degree of accuracy linearly along a main direction H by a linear guide (not shown). In the view according to FIG. 1 the main direction H runs perpendicular to the plane of the drawing. A thread axis A (FIG. 2) is defined as the central axis of symmetry of the thread 1 by the thread 1.

The carrier 7 can be freely moved in space by the industrial robot 6. In particular, this comprises not only a translatory movement but also a free adjustment in an interval of a spatial angle. In this manner the main direction H of the carrier can be aligned parallel to the thread axis A even in the case of an oblique state directed in any manner within the interval of the spatial angle.

Figure 2:
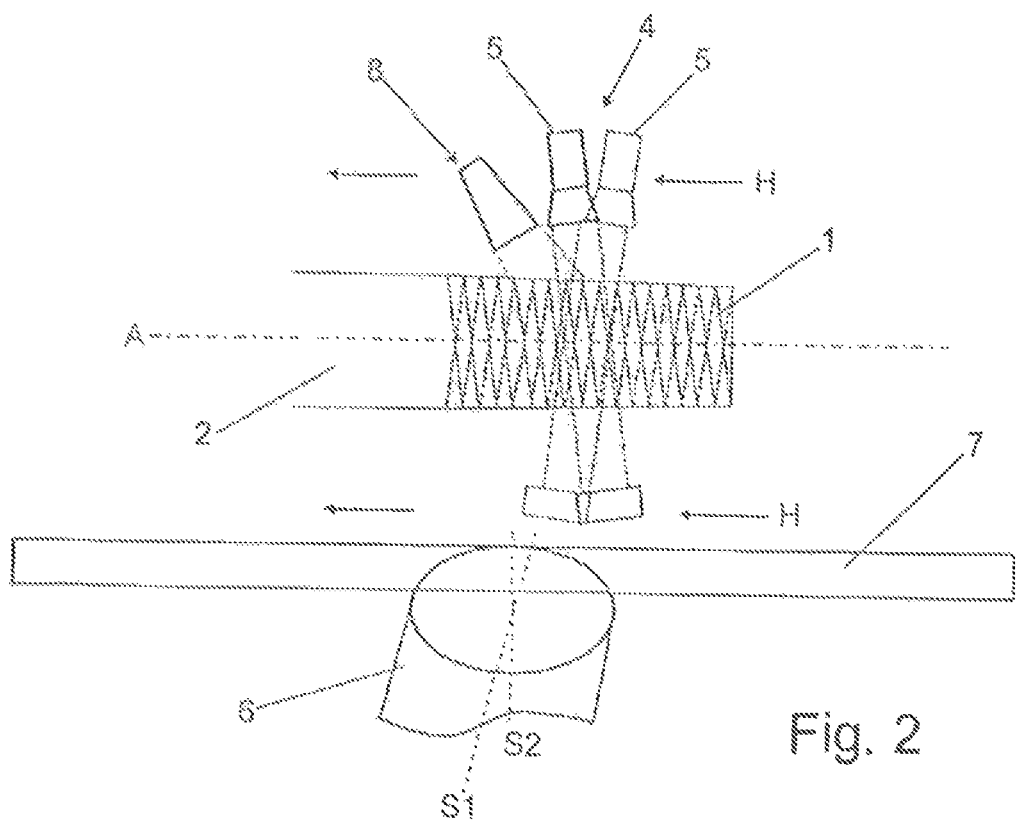
FIG. 2 shows a detailed side view of the apparatus of FIG. 1.

This alignment can also take place when using a universal industrial robot by a simultaneous moving of several segments and articulations. FIG. 2 shows two adjusting axes S1, S2 for schematically illustrating the free adjustability of the direction. The adjusting axes S1 and S2 and the thread axis A should not be parallel to each other. The three axes preferably extend perpendicular to each other.

In this manner, the main direction H and/or an orientation of the measuring conduit 4 can be brought into any direction by tilting about two adjusting axes S1, S2. In the present sense, the tilting around at least two adjusting axes S1, S2 is understood as equivalent to a free adjusting of direction (two degrees of freedom of the spatial direction) of the measuring conduit 4. With respect to the realization of the tilting, any desired number and combination of moved articulations, guides, etc. can be provided on the manipulator, which is illustrated by the universal industrial robot 6.

Figure 3:
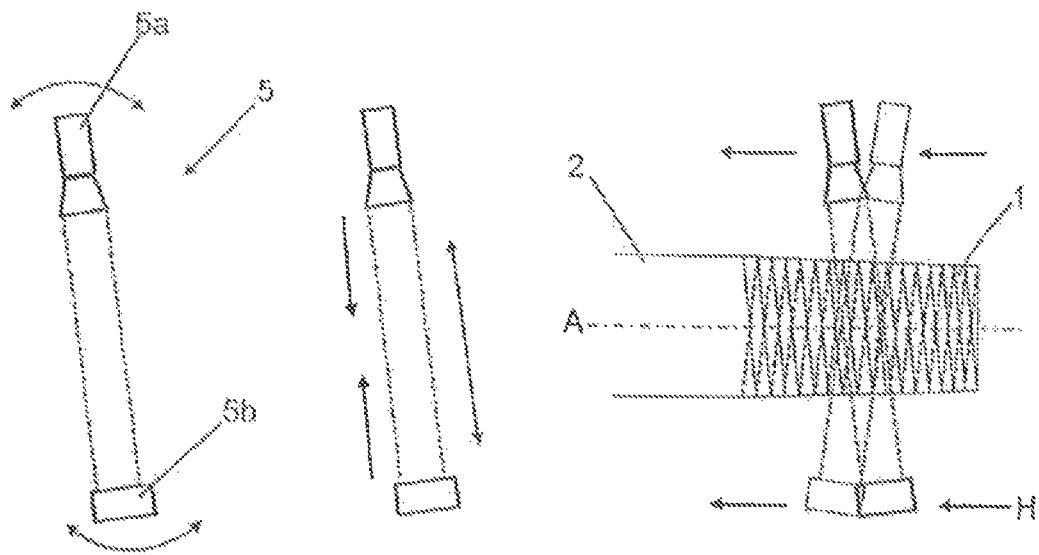
FIG. 3 shows a view of an optical measuring section of the apparatus of FIG. 1.

FIG. 3 illustrates a few possibilities of the adjusting of the optical measuring sections 5. In the present instance, the optical measuring sections 5 are each a telecentric lens in which a beam path onto an optical sensor 5a, which path is parallel on the object side, is illustrated.

At first, an optical axis of the measuring section 5 can be pre-adjusted by an angle relative to the carrier 7 and/or relative to a second optical measuring section of the same measuring conduit 4. As a result, for example, the theoretical rise of the cut thread can be adjusted.

In addition, the distance between the optical sensor 5a and a light source 5b of the optical measuring section can be adjusted. Furthermore, the position of the measuring section can be adjusted along its optical axis. On the whole, this can achieve an adaptation to different tube diameters and tube holders. Just like the pre-adjusting according to the thread rise, these adjustments can take place once before a continuous series measuring of tubes with the same production. To this end, adjustable holders (not shown) are advantageously arranged on the carrier 7.

In the right illustration in FIG. 3, the movement of the measuring conduit 4 is indicated by moving the carrier 7 along the main direction H.

Figure 4:
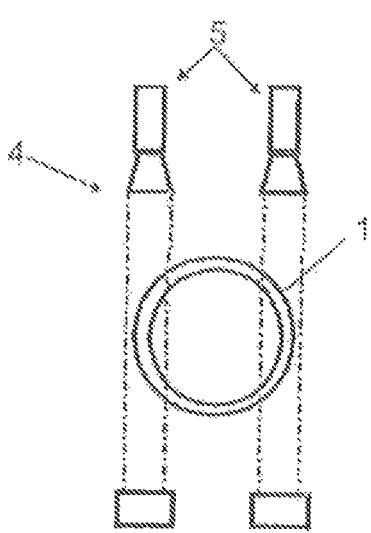
FIG. 4 shows a top view onto a measuring conduit of the apparatus of FIG. 1.

FIG. 4 shows a schematic view of the measuring conduit 4 aligned over the thread 1 according to the first exemplary embodiment of the invention.

Figure 5:
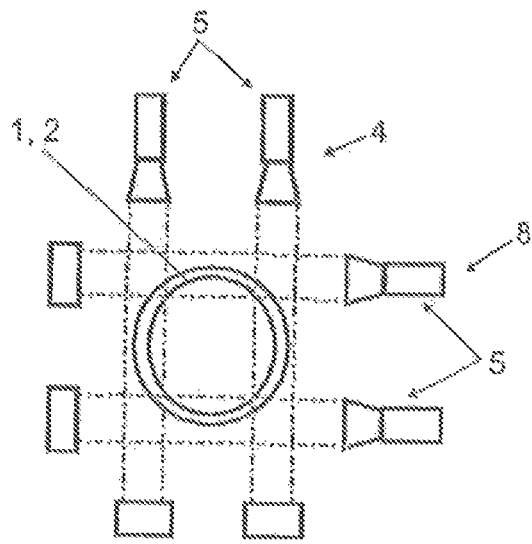
FIG. 5 shows a detailed view of a second exemplary embodiment of the invention with two measuring conduits.

FIG. 5 shows a second exemplary embodiment of the invention in which a second measuring conduit 8 is arranged on the carrier 7. The second measuring conduit 8 is arranged rotated about the main direction H by ninety degrees opposite the first measuring conduit 4 but otherwise has the same construction. As a result, different areas along the circumference of the thread 1 can be measured. In addition, information about an ovality of the tube 2 or of the thread 1 can be obtained in this way without the tube 2 having to be rotated in its holder. For construction reasons, the second measuring conduit 8 in the main direction H can be arranged in another plane than the first measuring conduit.

In other exemplary embodiments (not shown), even three or more measuring conduits 4 can be provided which can be rotated to each other by an appropriate angle, approximately 60° in the case of three measuring conduits.

FIG. 6 shows the procedure of the alignment of the measuring conduit 4 and of the main direction H relative to the thread axis A.

In the case of an oblique state or an existing angle between the straight lines A and H (case NG in the sketch), the projections of a thread course 1a are shaded along the optical axis of the measuring sections 5. A profile of the thread course measured with the optical sensor corresponds to the course NG sketched in dotted lines. The apparent width of the thread course is enlarged and the width of the free passage of light is reduced. Given an optimal alignment of the main direction H parallel to the thread axis A, the profile width of the thread course is minimal and the width of the free passage of light is maximal. The aligned state is achieved in that the tilting around both adjusting axes S1, S2 is carried out until the measured profile has appropriate extremal values.

FIG. 7 shows a schematic profile of a thread course with an undercut on one side. The undercut thread flank is shown in dotted lines and can be detected purely geometrically only insufficiently by the optical measuring sections.

A first light-section sensor 9 is arranged according to the first exemplary embodiment (see FIG. 2) on the carrier 7 in addition to the measuring conduit 4 and is directed at a geometrically suitable angle onto the undercut thread flank. A course of the surface of the thread flank illustrated as a cross section can be measured by the light-section sensor. This makes it possible to detect, for example, whether a break in the tool during the production of the thread resulted in a deformed surface.

Figure 8:
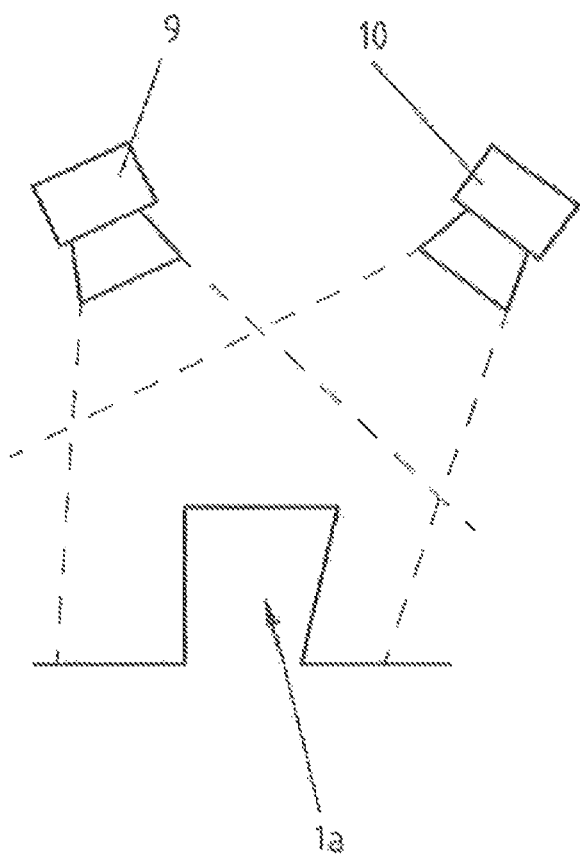
FIG. 8 shows a schematic view of a third exemplary embodiment of the invention with two light-section sensors.

In the third exemplary embodiment sketched in FIG. 8, in addition to the first light-section sensor 9 a second light-section sensor 10 is provided which is directed onto the opposite thread flank. As a result, the surfaces of both thread flanks can be rapidly and reliably checked. The measuring conduit 4 is not shown in FIG. 8.

It is understood that the specific features of the individual exemplary embodiments can be logically combined with each other as required.

The invention functions as follows:

At first, the optical measuring sections 5 are adjusted on the carrier 7 according to the theoretical dimensions and theoretical geometry of the tube 2 and of the thread 1. The manipulator 3 is moved into a base position.

Then, a produced tube is transferred into the holder and fixed. The industrial robot 6 then moves the carrier 7 with the measuring conduit 4 into coincidence over the thread 1 tube inwards (left direction in the view of FIG. 2).

During this process, tiltings about the adjusting axes S1, S2 are carried out and at the same time the images of the thread course taken by the telecentric lenses 5 are measured. The carrier 7 is aligned here in such a manner in space that an extremum of an optical width of the thread course is adjusted (see also the previous explanation for FIG. 6). This aligns the thread axis A and the main direction H of the carrier parallel to one another in the direction of the measuring.

The industrial robot 6 is subsequently stopped and only the carrier 7 is moved over its linear guiding. The measuring of the thread is carried out here. During the measuring the arrangement of one or more measuring conduits 4, 8 and of the first or also of the second light-section sensors 9, 10 are used. The measuring takes place advantageously and for achieving a rapid entire process while the measuring conduit 4 is again moved tube outwards again relative to the tube 2 (right direction in the view of FIG. 2).

According to the preferred exemplary embodiment no mechanical contact is made by the measuring apparatus for the measuring of the thread 1. A movement or rotation of the tube 2 does not take place during the entire measuring.

LIST OF REFERENCE NUMERALS 1 thread to be measured
1a thread course
2 tube
3 manipulator
4 measuring conduit
5 optical measuring section
5a optical sensor
5b illumination
6 industrial robot
6a segments of the industrial robot
6b articulations of the industrial robot
7 carrier
8 second measuring conduit
9 first light-section sensor
10 second light-section sensor
A thread axis
S1 first adjusting axis
S2 second adjusting axis
H main direction

What is claimed is:

1. A device for measuring a thread of a tube, comprising:
   a holder for detachable holding of the tube, wherein the thread is formed on an end of the tube,
   a first optical measuring section with an optical sensor, the optical measuring section being attached on a manipulator in order to move the first optical measuring section relative to the tube, the first optical measuring section being tiltable in an adjustable manner about a first adjusting axis relative to a thread axis of the thread,
   a second optical measuring section with a second optical sensor arranged on the manipulator, the first and second optical measuring sections forming a measuring conduit for simultaneously measuring opposite sides of the thread, wherein the measuring conduit is selectively tiltable by the manipulator about a second adjusting axis relative to the thread axis so that the measuring conduit is freely aligned inside an interval of a spatial angle,
   wherein the measuring conduit is arranged on a carrier which is movable about the adjusting axes, the carrier being selectively movable via a linear guide along a main direction, and wherein the main direction and/or an orientation of the measuring conduit is selectively movable in any direction by tilting about the first and second adjusting axes;
   wherein the end of the threaded tube is tapered at an angle relative to the thread axis, and wherein at least one of the first and second optical measuring sections are tilted about a corresponding one of the first and second adjusting axes to compensate for the tapered angle.

2. The device according to claim 1, wherein the measuring conduit is moved in a first step in a first direction by the manipulator in alignment with the thread and, in a second step the measuring conduit is moved out of alignment in the opposite direction, wherein a measuring of the thread takes place.

3. The device according to claim 1, wherein the manipulator comprises a freely movable robot.

4. The device according to claim 1, wherein at least one second measuring conduit is arranged on the manipulator, wherein the measuring conduits are aligned on different areas of the thread in its circumferential direction.

5. The device according to claim 1, wherein at least one light-section sensor is additionally arranged on the manipulator to detect light passing through the thread of the tube, wherein a surface of an undercut thread flank of the thread is measured by the at least one light-section sensor.

6. The device according to claim 5, wherein the at least one light-section sensor includes a second light-section sensor arranged on the manipulator, and wherein an opposing flank of the thread course is measured by the second light-section sensor.

7. The device according to claim 1, wherein one of the optical measuring sections comprises an optical measuring instrument selected from the group of telecentric lens, laser scanner or laser triangulator or LCD light band scanner (µ-meter).

8. The device according to claim 1, wherein the tube is fixedly secured without movement during the measuring of the thread.

9. The device according to claim 1, wherein the measuring of the thread is without a mechanical contact of a measuring sensor.

* * * * *